United States Patent [19]

Dougherty et al.

[11] Patent Number: 5,152,707

[45] Date of Patent: Oct. 6, 1992

[54] CONFORMABLE ANVIL FOR SUPPORTING IN-PROCESS FACE PANELS OF TENSION MASK COLOR CATHODE RAY TUBES

[75] Inventors: Lawrence W. Dougherty, Sleepy Hollow; Paul Strauss, Chicago, both of Ill.

[73] Assignee: Zenith Electronics Corporation

[21] Appl. No.: 612,651

[22] Filed: Nov. 13, 1990

[51] Int. Cl.⁵ .............................................. H01J 9/227
[52] U.S. Cl. .................................. 445/52; 51/217 R; 51/277; 269/21; 269/266
[58] Field of Search .................. 269/309, 266, 21; 51/216 R, 216 LP, 217 R, 217 T, 277; 445/52, 30

[56] References Cited

U.S. PATENT DOCUMENTS

| | | | |
|---|---|---|---|
| 3,853,313 | 12/1974 | Appenzeller et al. | 269/21 |
| 4,047,709 | 9/1977 | Thyberg et al. | 269/266 X |
| 4,088,312 | 5/1978 | Frosch et al. | 269/21 |
| 4,278,245 | 7/1981 | DiBattista et al. | 269/266 X |
| 4,745,330 | 5/1988 | Capek et al. | 445/30 |
| 4,811,523 | 3/1989 | Schmitz et al. | 51/217 T X |
| 4,876,480 | 10/1989 | Palac | 313/477 |
| 4,884,006 | 11/1989 | Prazak III | 313/477 |
| 4,908,995 | 3/1990 | Dougherty et al. | 51/217 R |

Primary Examiner—Kenneth J. Ramsey

[57] ABSTRACT

An anvil having a uniquely configurable support surface is provided for use in the manufacture of a face panel for a tension mask color cathode ray tube. The anvil is uniquely configurable for the panel and provides for contacting and conformably supporting the panel and preserving its intrinsic contour against gravitational deflection or other loading.

5 Claims, 6 Drawing Sheets

CONFORMABLE ANVIL FOR SUPPORTING IN-PROCESS FACE PANELS OF TENSION MASK COLOR CATHODE RAY TUBES

CROSS-REFERENCE TO RELATED APPLICATIONS

This application is related to but in no way dependent upon application Ser. No. 223,475 to Adler filed Jul. 22, 1988, now U.S. Pat. No. 4,902,257; and its continuations-in-part Ser. Nos. 370,204, now U.S. Pat. No. 4,973,280, and 405,378, now U.S. Pat. No. 4,998,901 filed respectively, Jun. 22, 1989 and Sep. 8, 1989, and application Ser. No. 07/654,843 filed Feb. 13, 1991, all of common ownership herewith.

BACKGROUND OF THE INVENTION

This invention relates to color cathode ray picture tubes, and is addressed specifically to the manufacture of tubes having shadow masks of the tension foil type in association with a substantially flat face panel. The invention is useful in the manufacture of color tubes of various types, including those used in home entertainment television receivers, and in medium-resolution and high-resolution tubes intended for color monitors. It is of special value in the manufacture of cathode ray tubes by the printed screen system.

The tension foil shadow mask is a part of the cathode ray tube front assembly, and is located in close adjacency to the face panel. As used herein, the term "shadow mask" means an apertured metallic foil which may, by way of example, be about 0.001 inch thick, or less. As is well known in the art, the shadow mask acts as a color-selection electrode, or "parallax barrier," which ensures that each of the three beams generated by the electron gun located in the neck of the tube lands only on assigned phosphor targets. The mask is supported in high tension a predetermined distance from the inner surface of the face panel by one or more support structures known as "rails." The predetermined distance is termed the "Q-height."

By way of example, a 14-inch face panel (diagonal measure) comprises a flat panel of glass that typically has dimensions (in inches) of 10.75 high, 13.5 wide and 0.52 thick; the desired Q-distance is 0.29. Dimensions of the face panel of a tube having a diagonal measure of 19 inches are 14.37 high, 18.25 wide 0.687 inch thick. Q-height is 0.42 inch.

Ideally, the two surfaces of a panel should be perfectly flat and planoparallel insofar as possible. It is of course the inner surface of the panel—the screen-bearing surface—which must ground to a precise degree of flatness. In current production practice, the screen-bearing surface is finished to a flatness of ±0.002 inch. This tolerance is adequate for the manufacture of tubes other than the printed-screen system; that is, a system in which a selected shadow mask is used as an optical stencil to deposit phosphors on a specific panel. The panel and the mask are thus "mated," and are fused together when the phosphor deposition is completed.

The process of making a face panel begins with the molding of a glass blank of proper size, but with extra thickness to compensate for the normal warpage that results from pressing and annealing, and the need to finish-grind and lap the blank to the desired thickness and flatness. A gob of molten glass is dropped into a recessed mold surrounded by a ring. A plunger presses the glass to fill the mold. The glass cools and the plunger and ring come apart, and the blank is removed and put on an annealing line. The resulting product is warped, and far out of flat. To provide for grinding and polishing, the blank is made thicker by 10 to 20 percent.

The first step in panel finishing is to rough-grind the blank to approximately the desired thickness, leaving just enough surface glass for finish grinding and lapping. Rough-grinding is accomplished by the rotary face grinding process, using a cupped wheel mounted on a vertical spindle. The work-piece is carried on a revolving table, and as the table revolves, so does the work-piece under the motion of the wheel. While a large quantity of glass is removed rapidly by this method because of the uninterrupted passage of the glass of the panel in contact with a large grinding wheel, the heat generated results in damage to the glass in the form of sub-surface cracks.

The second step is a grinding procedure typically used in grinding optical blanks and is known coloquially as "mud-grinding." The panel is lapped by a rotary, soft cast-iron wheel with the lapping compound comprising a slurry containing progressively finer particles. A relatively small amount of glass is removed—just enough to remove the sub-surface cracks resulting from the first process.

The final grind is also a rotary lapping process known as the free-abrasive machining ("FAM") process. Lapping is accomplished by introducing abrasive particles between a hard steel rotating wheel and the work-piece. The FAM process as applied to face panels is fully described in U.S. Pat. No. 4,884,006 of common ownership herewith. The primary purpose of the FAM process is to provide an internal anti-glare ("IAG") surface on the screening area of the panel; the IAG surface minimizes internal reflections in an operating tube. The FAM process also coincidentally helps to achieve the final flatness requirement, somewhat reducing the lapping time of the second lapping operation. It is noted that the FAM process is used primarily for surface finish. However, in the industry, the process is generally recognized as one intended to achieving a high degree of flatness in a variety of parts and materials.

There remains however a further problem, the solution of which this disclosure is addressed. Typical cathode ray tube panels are large in surface area compared with their thickness, and the modulus of elasticity of the panel glass is about 10 million psi, or about one-third the modulus of elasticity of steel. If the panel is warped or otherwise uneven in surface planarity, it will bend to a flatter position when forced against the wheel of a grinding machine such as the free-abrasive grinding machine. To affect good grinding action within a reasonable time, it is necessary to apply considerable force on the panel, using a pressure pad that serves to distribute the applied force uniformly over the surface of the panel. The panel is then ground flat while the clamping force is applied, and therefore, while the panel is in a bent or stressed condition. As soon as the clamping force is is removed, the panel will "unbend," and the ground surface will spring back toward its original warped condition. (It should be noted that even a firmly clamped panel that is warped can be ground to sub-mil flatness using the free-abrasive machining technique; however, an inordinately long time is required.)

As a result of the problem of panel spring back when the processing load is removed, a maximum flatness of only about ±0.002 inch can be achieved in a reasonable time.

While this degree of flatness is adequate for the manufacture of current FTM tubes, it is not suitable for the the manufacture of new generations of FTM tubes in which the screen is applied to the screening area without the use of a mating mask; to achieve this, a panel flatness of ±0.0002 inch with respect to a desired planarity is mandatory. A procedure for applying a screen by printing for use with an interchangeable mask system is disclosed in referent copending application Ser. No. 07/654,843, of common ownership. An interchangeable mask system is described and claimed in referent U.S. Pat. Nos. 4,902,257; 4,973,280; and 4,998,901.

OTHER PRIOR ART

Optical glass is commonly ground by a process known as "pitch blocking." Preparatory to grinding, a glass blank is laid on the surface of a pitch-coated cast-iron plate, and the assembly is heated to melt the pitch. The blank "wets" and settles into the pitch, after which the assembly is cooled. The blank is then ground to the desired optical shape, and the pitch is re-melted to free the blank.

For use in the manufacture of an optical telescope assembly, a special mount was designed for supporting the mirror during grinding and polishing. The mount consisted of 138 rods each of which contacted the back surface of the mirror to simulate a zero-gravity condition. Each rod exerted a known force to off-load the region of each pin by exactly the weight of the mirror in that region. To negate the downward pull of gravity and its effect on mirror contour, the sum of the upward forces of all pins was such that the upward force of the pins equaled the weight of the mirror. ("The Space Telescope," Cambridge University Press, 1989, Page 237.)

Relevant U.S. Pat. Nos.:
4,884,006 to Prazak
4,876,480 to Palac et al
4,908,995 to Dougherty et al

OBJECTS OF THE INVENTION

It is a general object of the invention to provide means and process for use in the manufacture of tension mask color cathode ray tubes that simplify production and reduce production costs.

It is an object of the invention to provide a cathode ray tube face panel having a screening surface of such flatness that phosphors can be deposited by an application process such as offset printing.

It is a further object of the invention to provide a panel having a screen-bearing surface of such flatness as to be usable in the manufacture of shadow mask color cathode ray tubes by the interchangeable mask method.

It is an object of the invention to provide a panel having a surface of such planarity that the installation and grinding of a mask support structure having a precise and planar Q-height is facilitated.

It is another object of the invention to provide a method for manufacturing face panels of near-perfect planarity.

Finally, it is a specific object of the invention to provide a front panel for a tension mask color cathode ray tube having a screening area with a surface planarity within ±0.0002 inch.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings (not to scale), in the several figures of which like reference numerals identify like elements, and in which:

DESCRIPTION OF THE PREFERRED EMBODIMENT

Figure 1:
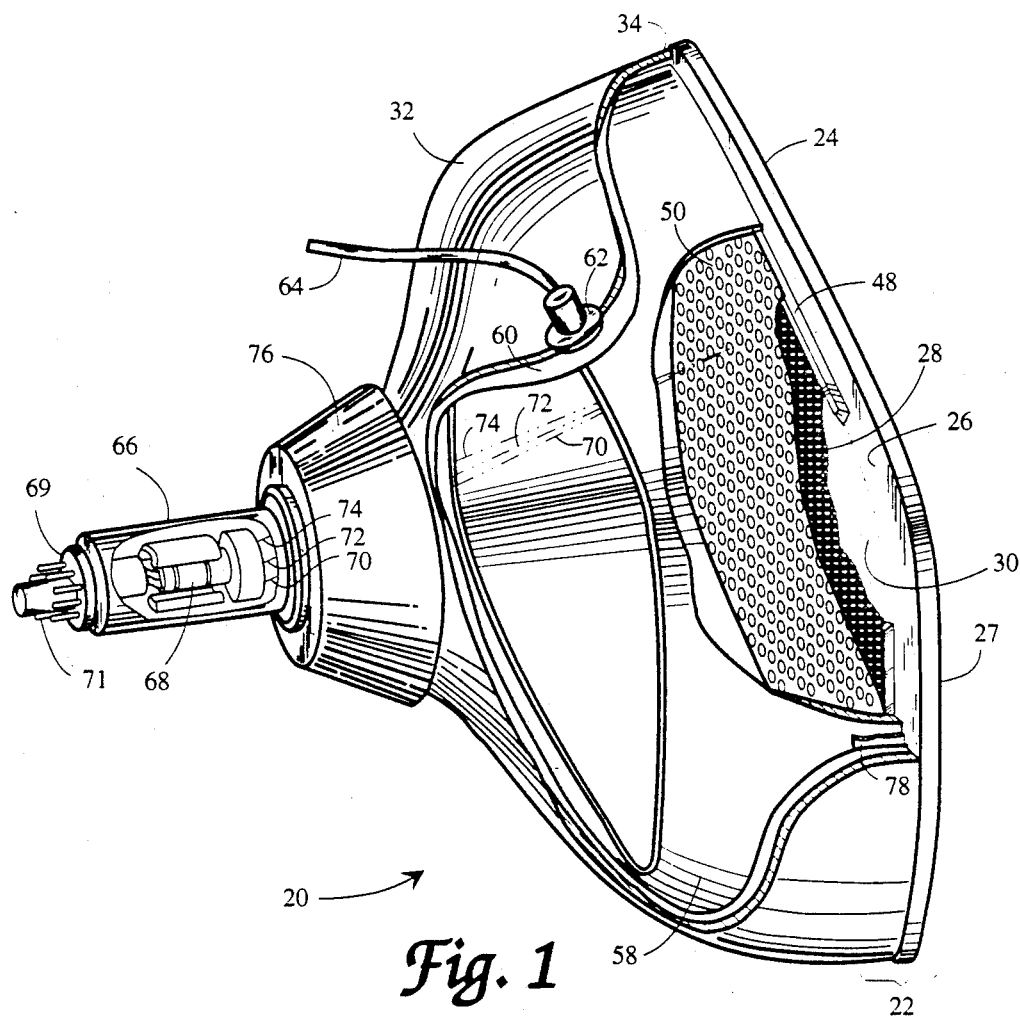
FIG. 1 is a side view in perspective of a tension mask color cathode ray tube having a prefabricated mask support structure subject to the means and process according to the invention, with cutaway sections that indicated the location and relationship of the major components of the tube.
Figure 2:
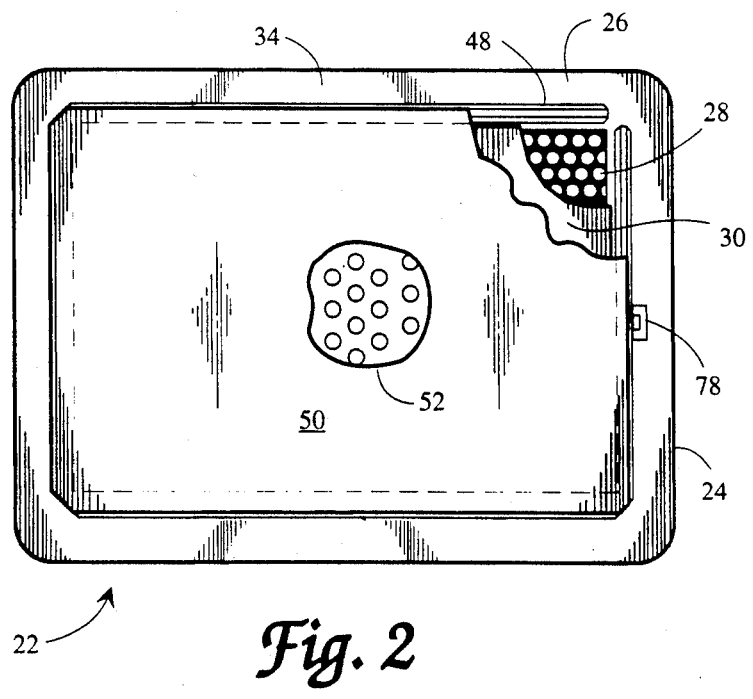
FIG. 2 is a plan view of the front assembly of a flat tension mask color cathode ray tube depicted in FIG. 1, with parts cut away to show the relationship of the face panel with the mask support structure and shadow mask; insets show mask apertures and phosphor screen patterns greatly enlarged.

A color cathode ray tube having a face panel manufactured according to the invention is depicted in FIGS. 1 and 2. The tube and its component parts are identified in the figures, and described in the following paragraphs in this sequence: reference number, a reference name, and a brief description of structure, interconnections, relationship, functions, operation, and/or result, as appropriate.

20: tension mask color cathode ray tube
22: front assembly

24: glass face panel

26: inner surface of face panel; the "screening side"

27: outer surface of face panel; the "viewing side"

28: centrally located phosphor screen on inner surface 26 of face panel 24 as applied to screening side 26; the round deposits of phosphor, shown as surrounded by the black matrix, are depicted greatly enlarged 30: film of aluminum 32: funnel 34: peripheral sealing area of face panel 24, adapted to mate with the peripheral sealing area of the mouth of funnel 32

48: mask support structure having a predetermined Q-height for affixation on opposed sides of screening area 28 for receiving and securing a tensed foil shadow mask; the mask-receiving surface of the structure is preground as described and claimed in referent U.S. Pat. No. 4,908,995, of common ownership herewith; the structure is also termed the "rails"

50: metal foil shadow mask; the mask is mounted in a state of tension on mask support structure 48 and secured thereto as by welding 52: shadow mask apertures, indicated as greatly enlarged in the inset for illustrative purposes; there is one aperture for every triad of phosphor deposits 58: magnetic shield, internal (a shield, not shown, may also be installed external to the tube envelope)

60: internal conductive coating on funnel

62: anode button

64: high-voltage conductor

66: neck of tube 20

68: in-line electron gun providing three discrete in-line electron beams 70, 72 and 74 for exciting respective red-light-emitting, green-light-emitting and blue-light-emitting phosphor deposits on screen 28

69: base of tube

71: metal pins for conducting operating voltages through the base of the tube 69 to the electron gun 68

76: yoke which provides for the traverse of beams 70, 72 and 74 across screen 28

78: contact spring which provides an electrical path between the funnel coating 60 and the mask support structure 48.

An anvil according to the invention having a uniquely configurable support surface is used in the manufacture of a tension mask color cathode ray tube having a face panel with a viewing side and a screening side. The anvil according to the invention is uniquely configurable for contacting and conformably supporting the face panel and preserving its intrinsic contour against gravitational deflection or other loading along an axis normal to the panel. The anvil is uniquely configurable by virtue of a plurality of adjustable supports, preferably comprising z-axis-oriented pins movable and positionally fixable, which provide for contacting and conformably supporting the panel without distortive pressure. The adjustable supports provide for moving the face panel into position for subsequent operations on the panel without exerting distortive pressure on the panel. The operations may include flattening, or "planarizing," the screening side of the panel into a condition of near-perfect planarity, and printing a phosphor screen on the screening side by a printing apparatus.

With reference to FIGS. 3–6, there is depicted an apparatus according to the invention for planarizing the screening side of a face panel by abrasive means. The apparatus comprises an anvil 82 having a uniquely configurable support structure comprising a plurality of z-axis-adjustable supports for contacting the viewing side 87 of face panel 84 for inflexibly supporting panel 84. Anvil 82 is shown as mounted in conjunction with a face panel 84 and in contact with the viewing side 87 of the face panel 84. The planarizing means is indicated as being abrasive means 86 comprising a grinding wheel rotating in a counter-clockwise direction as indicated by arrow 88. The surface 90 of wheel 86 is charged with an abrasive which is effective in the grinding and finishing of glass, such as carborundum or aluminum oxide. As wheel 86 rotates, the face panel, in conjunction with the anvil 82, also rotates, but slowly in an opposite, clockwise direction, as indicated by arrows 92A and 92B. The abrasive means could as well comprise lapping means in which an abrasive slurry is introduced between a revolving metal wheel, and the workpiece. The abrasive material embeds itself in the soft iron of the wheel and cuts the harder material, which in this case is the glass of the face panel.

Pressing the planarizing means—the grinding wheel 86—into abrasive relationship with the face panel may accomplished with only the weight of the anvil 82. If greater pressure is required, additional weight (not shown) may be added to the top of the anvil.

As a result, the face panel 84 is unflexed through the support of anvil 82, and upon withdrawal of the abrasive means, face panel 84 will not reflex into an out-of-flat condition.

Figure 3:
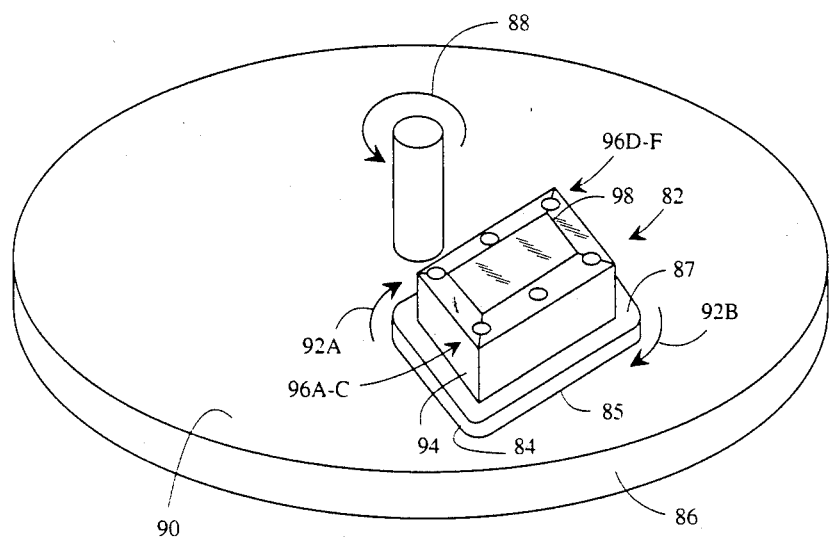
FIG. 3 is a view in perspective of face panel being held against a grinding wheel and conformably supported by the means and method according to the invention.

Anvil 82 comprises a first sealed chamber 94 having a plurality of adjustable supports within chamber 94 which contact the viewing side 87 of panel 84 and inflexibly support the panel. The adjustable supports comprise z-axis-oriented pins 96A–F which are movable and positionally fixable. The pins 96A–F are indicated in FIG. 3 as being, by way of example, six in number; there can any reasonable number of pins, with the number depending on the size of the panel and the amount of conformable support required. For example, a 14-inch face panel may require as many as fifteen pins to provide an adequate measure of conformable support in some manufacturing operations, while a 20-inch panel will require correspondingly more. The sealed chamber 94 is shown as being topped with a protective cover 98 which forms a second sealed chamber, as will be described.

Figure 4:
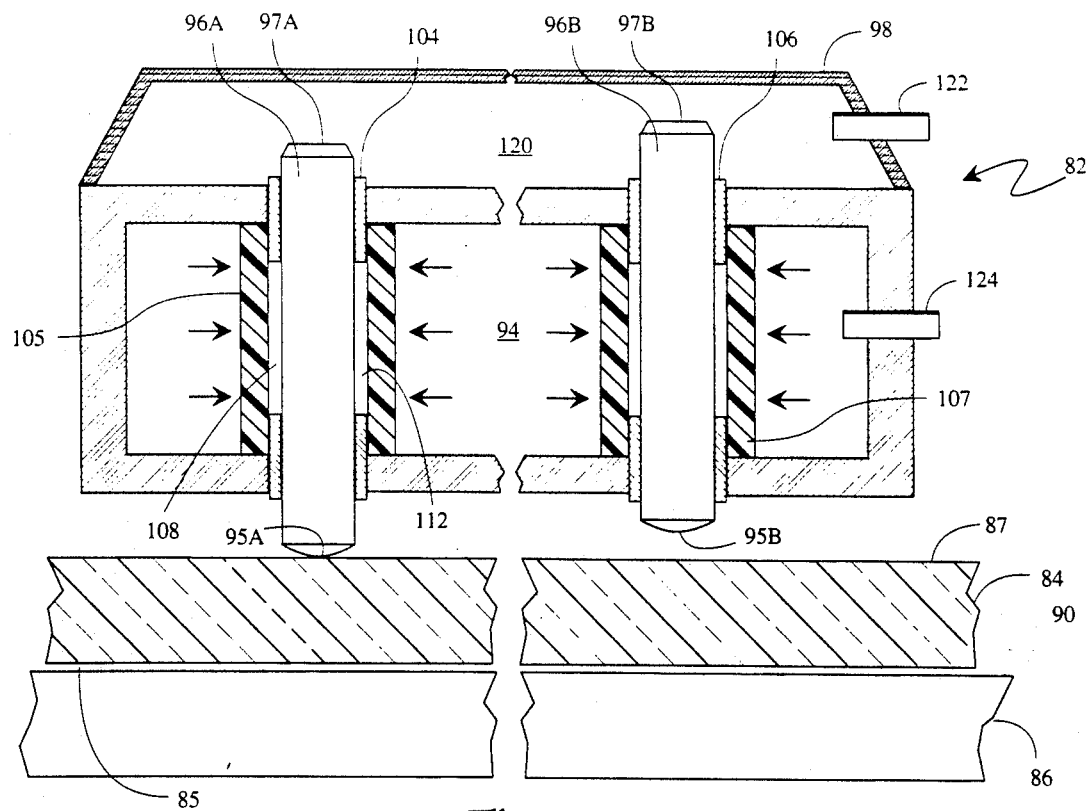
FIG. 4 is a cross-sectional view in elevation of an anvil having a uniquely configurable support surface for contacting and conformably supporting a face panel, and depicting internal details of the anvil shown by FIG. 3.

With reference to FIG. 4, the sealed chamber 94 of anvil 82 is shown in cross-section in relation to face panel 84 and an abrasive means comprising a grinding wheel 86. Two pins 96A and 96B, respectively, noted as being representative of all pins 94A–F shown by FIG. 3, are depicted. The respective ends 95A and 95B of pins 96A and 96B will be noted as extending from sealed chamber 94 for contacting the viewing side 87 of panel 84. Pins 96A and 96B are enclosed by respective slit sleeves 104 and 106 which are press-fitted in the walls of sealed chamber 94. The slit sleeves are sized to permit easy axial movement of the pins. Slit sleeves 104 and 106 are in turn tightly enclosed in flexible tubes 105 and 107, made from an elastomer such as neoprene rubber or a silicone rubber.

Figure 5:
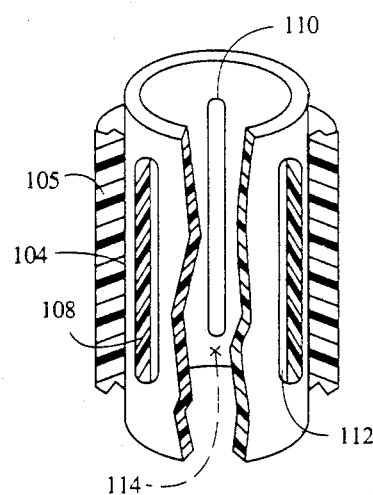
FIG. 5 is a view in cross-section and in elevation showing details of a component of the anvil of FIG. 4.

FIG. 5 indicates the configuration of sleeve 104, which is typical of all sleeves enclosing the pins 96A–F. There are four vertical slits in each of the sleeves, as indicated by slits 108, 110 and 112 (the location of slit 114, which is opposite slit 110 is indicated but not shown because of the cutaway). The slits cause the sleeves, which are made of metal, to be compressed inwardly when under external pressure, which is exerted by the elastomeric tubes that enclose the slit sleeves.

Means are provided for urging the ends of pins 96A-F (as indicated by ends 95A and 95B) into near pressureless contact with the viewing side 87 of panel 84. Pin movement is indicated by the position of pin 96B, in which the end 95B is shown as being retracted from the viewing side 87 of panel 84, and the position of pin 96A, in which end 95B of pin 96A is shown as being in contact with viewing side 87 of panel 84. Pins 96A-96F are urged into near pressureless contact with viewing side 87 of panel 84 by the pressurization of the second sealed chamber 120.

The means for pressurizing second sealed chamber 120 may, by way of example, comprise a fluid such as air at just enough pressure upon the ends of the pins (for example, upon respective ends 97A and 97B of pins 96A and 96B) to impel pins 96A-F to contact the panel without exerting distortive pressure on the panel. The pressure for example may be about 10 pounds per square inch. The fluid is introduced through tube 122. Second chamber 120 may be formed by a shell 98, indicated as being transparent, made of glass or a suitable plastic; the transparency provides for observing the performance of the pins 96A-F during the installation and grinding operations. Shell 98 could as well be made of metal. As soon as the ends of pins 96A-F make contact with viewing side 87 of face panel 84, the pressure within second sealed chamber 120 is reduced to near zero, and the contact of the pins against side 87 of panel 84 becomes nearly pressureless; that is, a minimum of deforming pressure—pressure in terms of a few grams—is applied to the panel by the pins. Immediately, chamber 94 of anvil 88 is pressurized by a fluid flowing through tube 124. The pressurized fluid exerts pressure on the flexible tubes 105 and 107 (using FIG. 4 as an example), which in turn exert inward pressure on slit sleeves 104 and 106, as indicated by the associated arrows in FIG. 4, such that pins 96A and 96B are positionally fixed with no axial movement of the pins which might otherwise deform panel 84; in short the pins, in contacting the viewing side 87 of the panel 84, and conformably supporting the panel, exert no distortive pressure on the panel. The pressure required to flex the slit sleeves inwardly may be, for example, about 100 pounds per square inch. The pressurizing medium can be air or a light hydraulic fluid.

It is by this means according to the invention that the face panel is held unflexed under the planarizing means comprising abrasive means, and upon withdrawal of the abrasive means, the face panel will not reflex into an out-of-flat condition.

It is noted that the foregoing condition is one in which the panel lies in a horizontal plane. In this case, there is a slight encumbrance of the pins on the panel due to their weight. On the other hand, if the foregoing procedure is carried out when the panel is in a vertical condition, the pins will exert no significant pressure on the panel.

The dimensions of the anvil according to the invention when designed for use with a 14-inch face panel may be, by way of example, about 10 inches high by 12 inches wide by 3.5 inches high. For use with larger tubes, such as a 19-inch tube, the dimensions, which are not critical, would be commensurately greater. The body of the anvil may be die-cast or molded from cast iron. The shell 98 of second sealed chamber 120 may be formed from glass or a plastic such as Plexiglas, and is gasketed at the interface with the body of the adjustable anvil to prevent inordinate leaking of the pressurizing medium and to prevent entry of abrasive compounds or slurries. The pins 96A-F are preferably made from stainless steel, and their diameter may be for example about 0.0375 inch, with length of about three inches. It is preferable that the area of the press-fit of the pins at the ends nearest the panel be not completely air-tight (or fluid-tight) as a slight, continual leaking of air or hydraulic fluid will prevent entry of abrasives compounds or slurries into the first sealed chamber 94.

Figure 6:
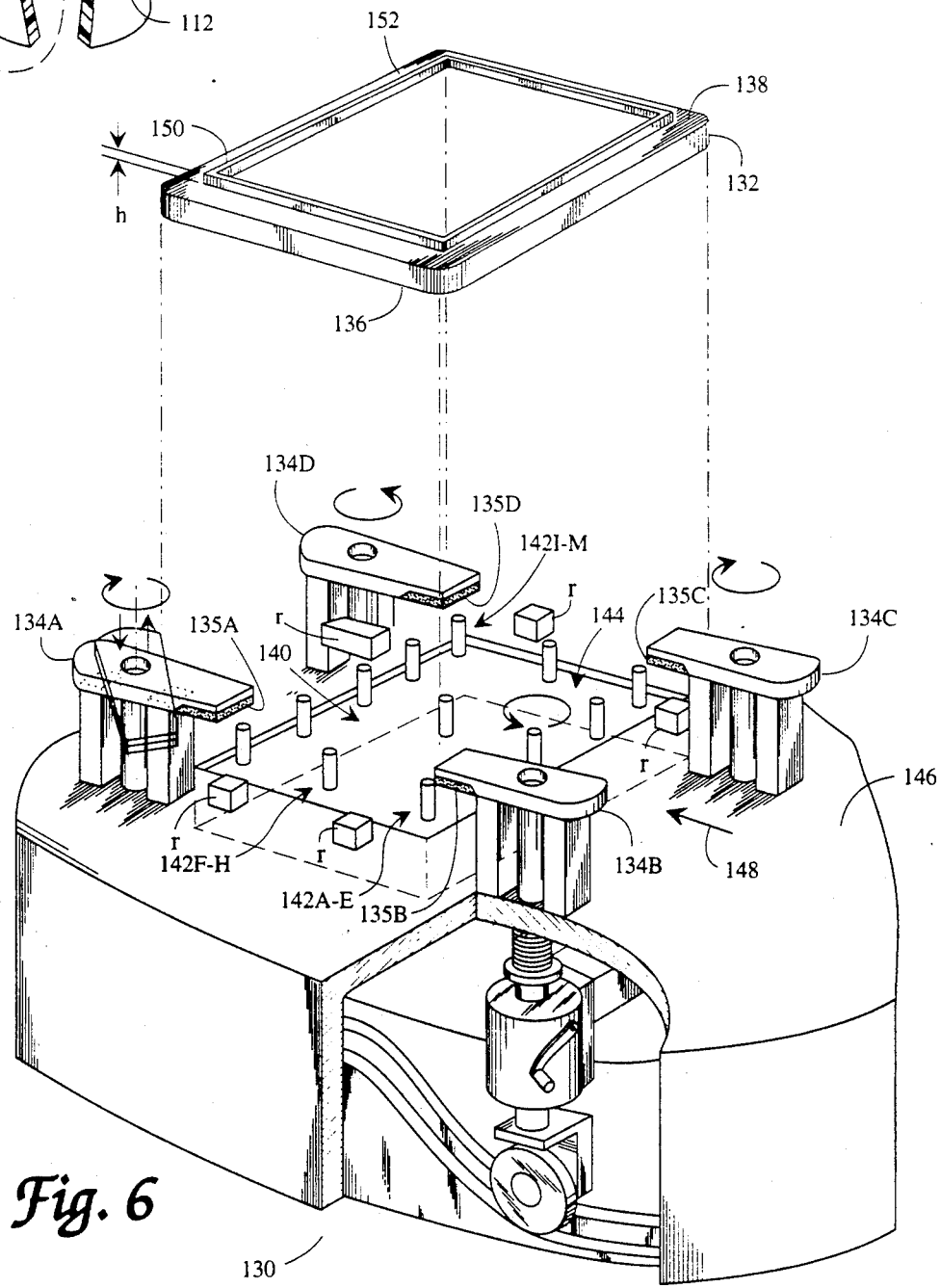
FIG. 6 is a view in perspective and partially cut away of an apparatus for the abrasive machining of the mask-receiving surface of a mask-support mounted on face panel. The panel is shown as exploded from a fixture that holds the panel unflexed under the pressure of a grinding wheel.

FIG. 6 depicts an apparatus 130 for forming on a tension mask support structure (also termed the mask rails) a surface for receiving a foil tension mask in a plane parallel to and at a precise fixed distance from the plane of the screen-receiving surface of the panel. This distance, known as the "Q-height," is indicated by the symbol "h." The apparatus shown represents an embodiment according to the present invention of the FIG. 1 rail grinding apparatus fully described and claimed in referent U.S. Pat. No. 4,908,995 issued Mar. 20, 1990, of common ownership herewith. Reference to the cited patent and the relevant figures is suggested during the following explanation of the modification of the '995 structure according to the present invention.

The modification of the '995 apparatus according to the present invention is depicted in FIG. 6. In the modified apparatus 130, the four spring-loaded plastic buttons (7) shown in FIG. 1 of the '995 patent have been removed. In preparartion for receiving a panel 132, the four clamps 134A-D having stops 135A-135D rotate upwardly and outwardly as indicated by the associated arrows, by means such as described in the '995 patent, and the viewing side 136 of the panel 132 is lowered onto the anvil 140, which is mounted in recess 144 of table 156. Proper registration of the panel 132 on table 146 is provided by a series of registration means "r". A plurality of pins 142A-M, indicated as being thirteen in number by way of example—project upwardly from an anvil 140.

Figure 7A:
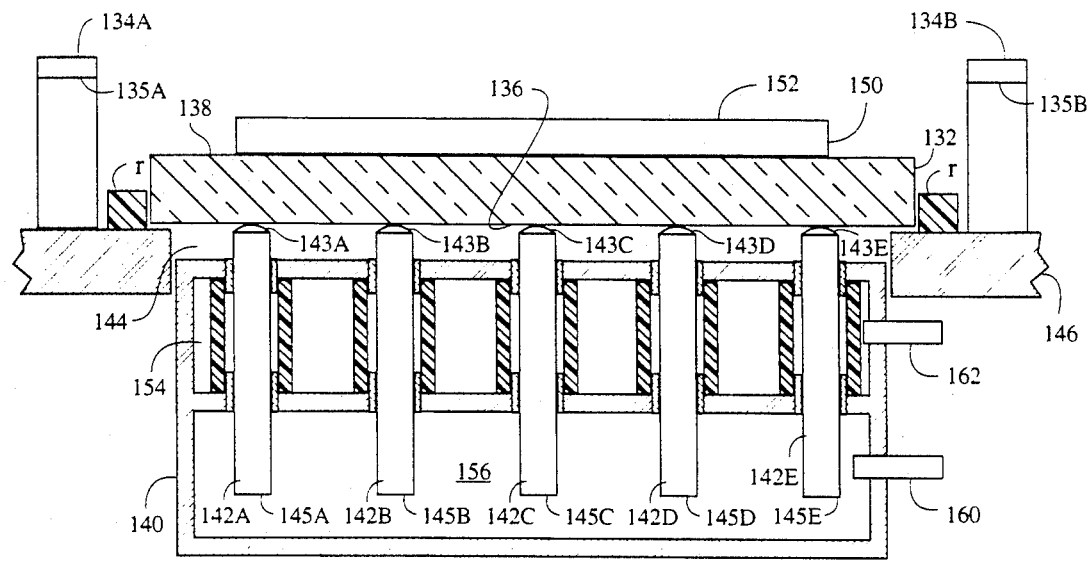
FIG. 7A is a cutaway view in elevation depicting schematically salient details of the apparatus of FIG. 6.

Pins 142A-M are normally retracted so that their respective ends are level with the surface of the table 146. This condition is shown in FIG. 7A, which depicts schematically pins 142A-E of the thirteen pins 142A-M enclosed in the anvil 140 according to the invention, as seen from the direction of arrow 148. It is to be noted that the pins 142A-E and 142I-M which are lateral to the "long" sides of the panel 132, are preferably located directly beneath the mask support rails 150 to support the panel 132 along the lines of greatest pressure on the panel resulting from the abrasive-forming operation on the surface 152 of rails 150 that provide for receiving and securing the foil shadow mask.

Anvil 140 comprises a first sealed chamber 154 having a plurality of pins 142A-M within, noted as being movable and positionally fixable. The six pins indicated in FIGS. 7A and 7B—pins 142A-E—are representative of all pins 142A-M. As shown by the figures, the ends 143A-143E of the pins 142A-E that extend from first sealed chamber 154 are in contact with the viewing side 136 of panel 132. Each of the pins 142A-E are shown as being enveloped within chamber 154 by deformable sleeves and flexible tubes, the structure and functions of which are fully described heretofore in connection with FIGS. 4 and 5.

A second sealed chamber 156 is located adjacent to first sealed chamber 154, and receives the opposite ends 145A-145E of pins 142A-E; that is, the ends opposite those that contact the viewing surface 136 of panel 132. A means for pressurizing the second sealed chamber 156, which may comprise a fluid under pressure, provides for moving panel 132 into an elevated processing position as depicted by arrows 159 in FIG. 7B. A difference in the action of the pins 96A-F described in connection with FIGS. 3-5 will be noted, in that pins 96A-F perform a passive role in that they merely move into near pressureless contact with the associated face panel 84. On the other hand, the pins 142A-M shown by FIG. 6 (of which pins 142A-E are representative) play a more active role in that they actually move face panel 132 into the elevated position shown by FIG. 7B. The pressure of the fluid, whether air or a hydraulic liquid, applied through tube 160 to second sealed chamber 156, is preferably just enough to gently move panel 132 into an elevated position against the stops 135A-135D provided by the clamps 134A-D shown by FIG. 6, after they have rotated inwardly to the position indicated schematically in FIG. 7B. (Note: clamps 134A and 134B shown in FIGS. 7A and 7B have been relocated to the ends of the panel 132 for illustrative purposes.) If a panel weighs seven pounds, the fluid pressure in second sealed chamber 156 should be just enough to lift the panel 132 so that it comes gently to rest against the stops 135A-D of clamps 134A-D without distortive pressure on panel 132.

When the panel has come to rest against stops 135A-D provided by clamps 134A-D, means are provided for pressurizing first sealed chamber 154 to deform the sleeves indicated and fixedly contact and positionally clamp pins 142A-M against the viewing side 136 of panel 132. As with the second sealed chamber 156, the pressurizing fluid in first sealed chamber 154 may comprise air or a light hydraulic fluid routed through a tube 162.

Figure 7B:
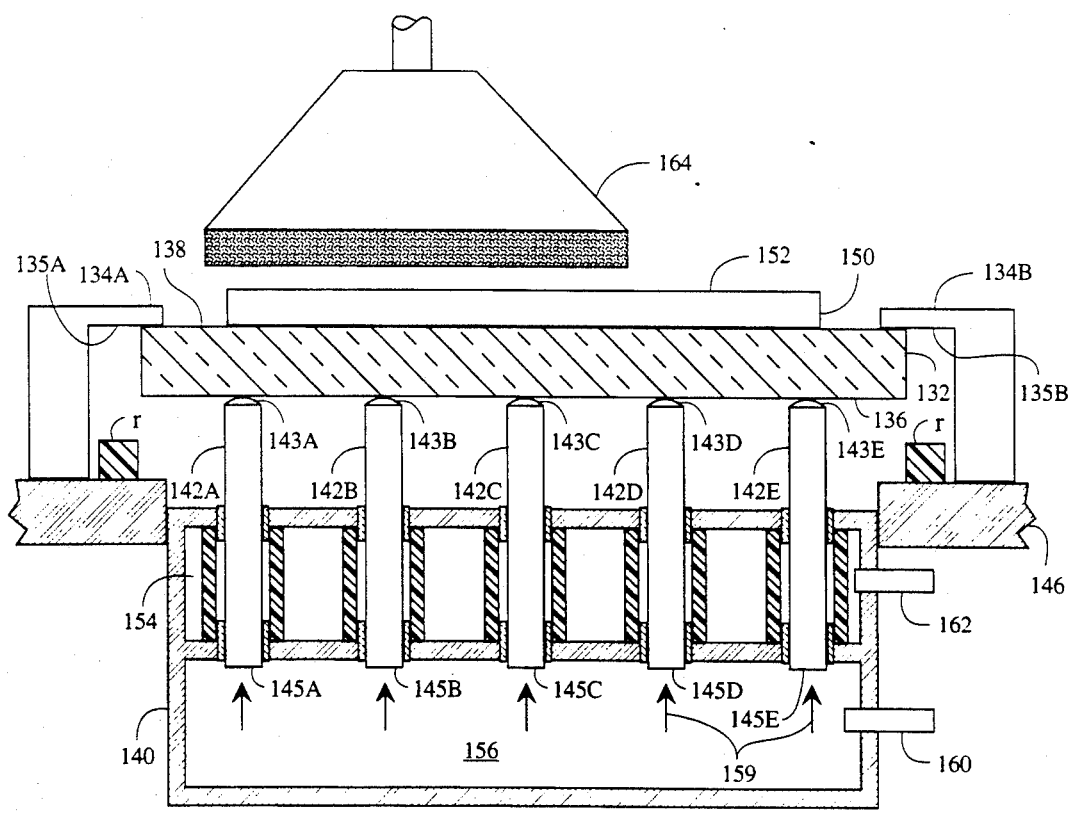
FIG. 7B depicts the elevation of the face panel from the table of the apparatus for an abrasive machining operation.

After the elevation of face panel into the position shown by FIG. 7B, shadow-mask-receiving surface 152 of the mask-support structure is in position for an abrasive machining operation such as that provided by the cup-shaped grinding wheel 164 indicated. The abrasive machining may as well comprise a lapping operation.

By the means described, and according to the invention, the intrinsic contour of the face panel is preserved against gravitational or other loading along a z-axis normal to the panel, such as the loading from an abrasive machining operation.

A face panel may be supported by the means and method according to the invention during the process of printing a phosphor screen on a face panel as described and claimed in referent copending application Ser. No. (D6332) of common ownership herewith.

Figure 8A:
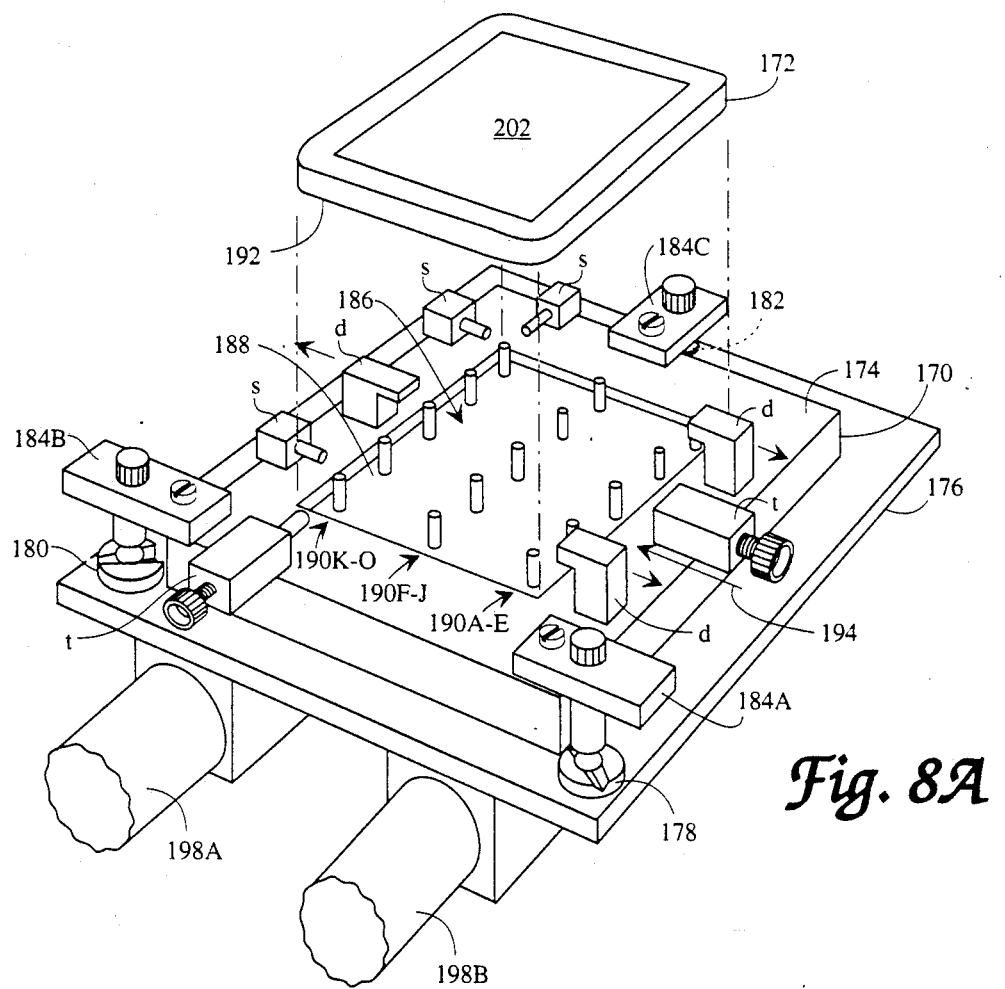
FIG. 8A is a schematic view in perspective of an apparatus used in applying a screen to a panel conformably supported according to the invention, with the panel shown as exploded from the apparatus.
Figure 8B:
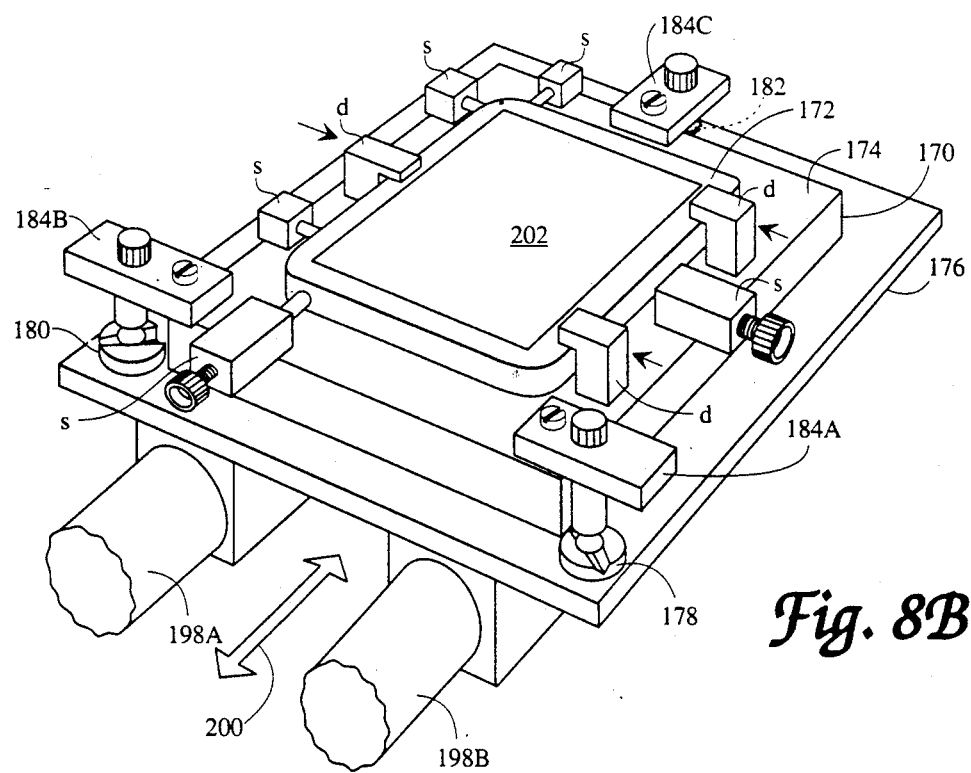
FIG. 8B is view similar to FIG. 8A showing the panel held in position for a screening process described and claimed in copending application Ser. No. 07/654,843 filed Feb. 13, 1991, of common ownership herewith.

With reference to FIGS. 8A and 8B, there is depicted a fixture 170 for supporting a face panel 172 during a screen-printing operation. The fixture is similar in many ways to the apparatus 130 described in connection with FIGS. 6, 7A and 7B, so only the salient differences are described.

Fixture 170 is shown as comprising a table 174 which is mounted on a carriage 176. The means of mounting consists of three registration means 178, 180 and 182, each of which comprises a ball-and-groove assembly. The ball component of the ball-and-groove assemblies may be attached to table 174 by plates 184A, 184B and 184C secured to table 174 by machine screws, as indicated, while the respective groove components may be attached by welding. Fixture 170 provides three locators "s" for registration of the panel 172, and panel hold-downs "d", also as indicated. Two bias means "t" provide for panel contact along with the aforementioned locators "s".

Table 174 is shown as having a recess 186 therein for receiving an anvil 188 having a plurality of adjustable supports 190A-O extending therefrom; the fifteen supports include in their structure the fifteen pins shown, noted as being movable and positionally fixable. The pins of adjustable supports 190A-O are positioned into near pressureless contact with the viewing side 192 of panel 172 by lowering panel 172 from the elevated position depicted in FIG. 8A, to the position where panel 172 is adjacent to the surface of table 174, as indicated by FIG. 8B. A sequential displacement of panel hold-downs "d", indicated by the associated arrows, is of course necessary for lowering panel 172 to a position adjacent to the surface of table 174.

Figure 9:
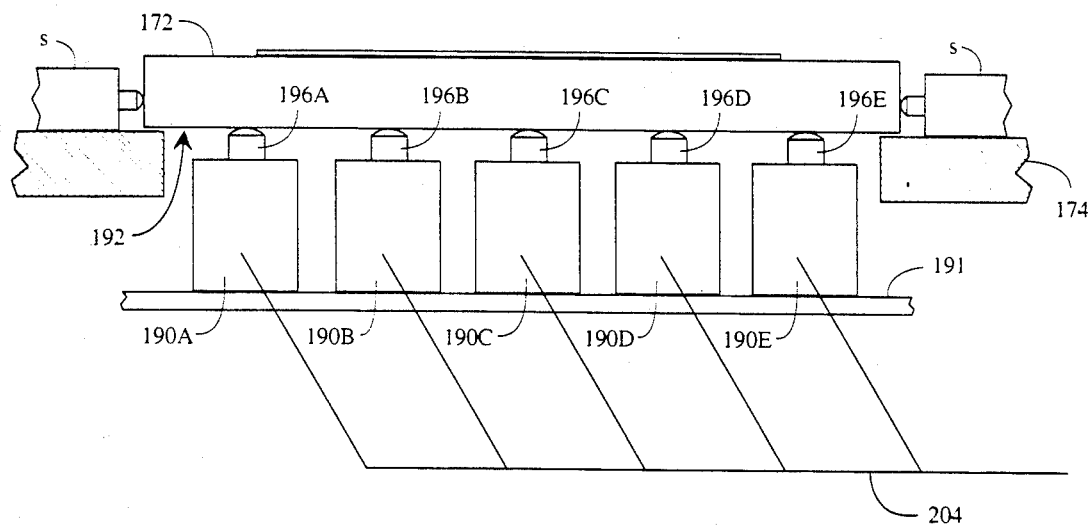
FIG. 9 a view in elevation showing schematically components of the apparatus depicted by FIGS. 8A and 8B for conformably contacting and supporting a panel.

With reference now to FIG. 9, there is shown the array of z-axis-oriented adjustable supports 190A-E located beneath table 174, as seen from the viewpoint indicated by arrow 194 in FIG. 8A. Supports 190A-E are representative of all supports 190A-O. Adjustable supports 190A-E are indicated as resting on a support 191 which comprises a part of fixture 170. The ends of pins 196A-E of adjustable supports 190A-E are in near pressureless contact with the viewing side 192 of panel 172. The panel 172 is then inflexibly supported by immovably fixing the pins of adjustable supports 190A-O so that the intrinsic contour of panel 172 is preserved against gravitational or other loading incidental to the screen-printing operation.

In the screen-printing operation, carriage 176 moves back and forth on slide rods 198A and 198B as indicated by arrow 200. The traverse causes face panel 172 to pass under a printing roller for printing a phosphor screen on screening area 202 of panel 172, as described and claimed in referent copending application Ser. No. 07/655,361, filed Feb. 13, 1991, of common ownership herewith.

Adjustable supports 190A-O used in this application may comprise modifications of positive clamping cylinders such as used for holding parts during machining operations. Such cylinders are exemplified by the series of components supplied by Flodyne/Hydradyne company of Rockford, Ill. under the designation "WRS." The cylinder of these components has a built-in spring disk which clamps a plunger. Upon introduction of hydraulic pressure, the spring is compressed and the plunger is unclamped. The plunger is projected from the body of the cylinder by a second spring. Similar devices are made by Spieth, the products of which are distributed by Advanced Machine and Engineering Company of Rockford, Ill.

With reference again to FIG. 9, a network 204 indicates schematically a hydraulic supply system for controlling the clamping of the plungers in the "WRS" series of positive clamping cylinders.

It is noted that fixture 170 could be replaced by some adaptation of the apparatus 130 depicted in FIG. 6, in which the operation of placing and registering the panel is largely automated. In such an adaptation, the z-axis-oriented pins could be moved to elevate the panel into printing relationship with a screen-printing apparatus.

While a particular execution of the invention has been shown and described, it will be readily apparent to those skilled in the art that changes and modifications may be made in the inventive means and process without departing from the invention in its broader aspects, and therefore, the aim of the appended claims is to cover all such changes and modifications as fall within the true spirit and scope of the invention.

We claim:

1. For use in the manufacture of a tension mask color cathode ray tube having a face panel with a viewing side and a screening side, an apparatus for conformably supporting said face panel during the printing of said screening side by screen-printing apparatus, comprising:

an anvil having a uniquely configurable support structure comprising a plurality of z-axis-adjustable supports for contacting and inflexibly supporting said viewing side of said face panel;

means for positioning said screening side of said face panel, as supported by said anvil, into printing relationship with said screen-printing apparatus;

such that the intrinsic contour of said face panel is preserved against gravitational or other loading incidental to the screen-printing operation; and means for moving the screening side of said face panel into contact with means for registering said face panel with said screen-printing apparatus.

2. The apparatus according to claim 1 wherein said z-axis adjustable supports comprise a plurality of z-axis-oriented pins movable and positionally fixable.

3. The anvil according to claim 1 including means for positioning said screening side of said face panel into printing relationship with a screen-printing apparatus.

4. For use in the manufacture of a tension mask color cathode ray tube having a face panel with a viewing side and a screening side, a process for conformably supporting said face panel during a screen-printing operation, comprising:

providing an anvil having a uniquely configurable support structure, with a plurality of z-axis-oriented pins movable and positionally fixable extending therefrom;

positioning said pins into near pressureless contact with said viewing side of said face panel;

inflexibly supporting said face panel by immovably fixing said pins;

printing said screen on said screening side;

such that the intrinsic contour of said face panel is preserved against gravitational or other loading incidental to said screen-printing operation.

5. For use in the manufacture of a tension mask color cathode ray tube having a face panel with a viewing side and a screening side, a process for conformably supporting said face panel during a screen-printing operation, comprising:

providing an anvil having a uniquely configurable support structure with a plurality of pins extending therefrom normal to said panel, said pins being movable and positionally fixable;

positioning said pins into near pressureless contact with said viewing side of said face panel;

moving said pins to bring said screening side of said face panel into printing relationship with screen-printing apparatus;

inflexibly supporting said face panel on said anvil by immovably fixing said pins;

such that the intrinsic contour of said face panel is preserved against gravitational or other loading incidental to the screen-printing operation.

* * * * *